United States Patent Office 3,249,481
Patented May 3, 1966

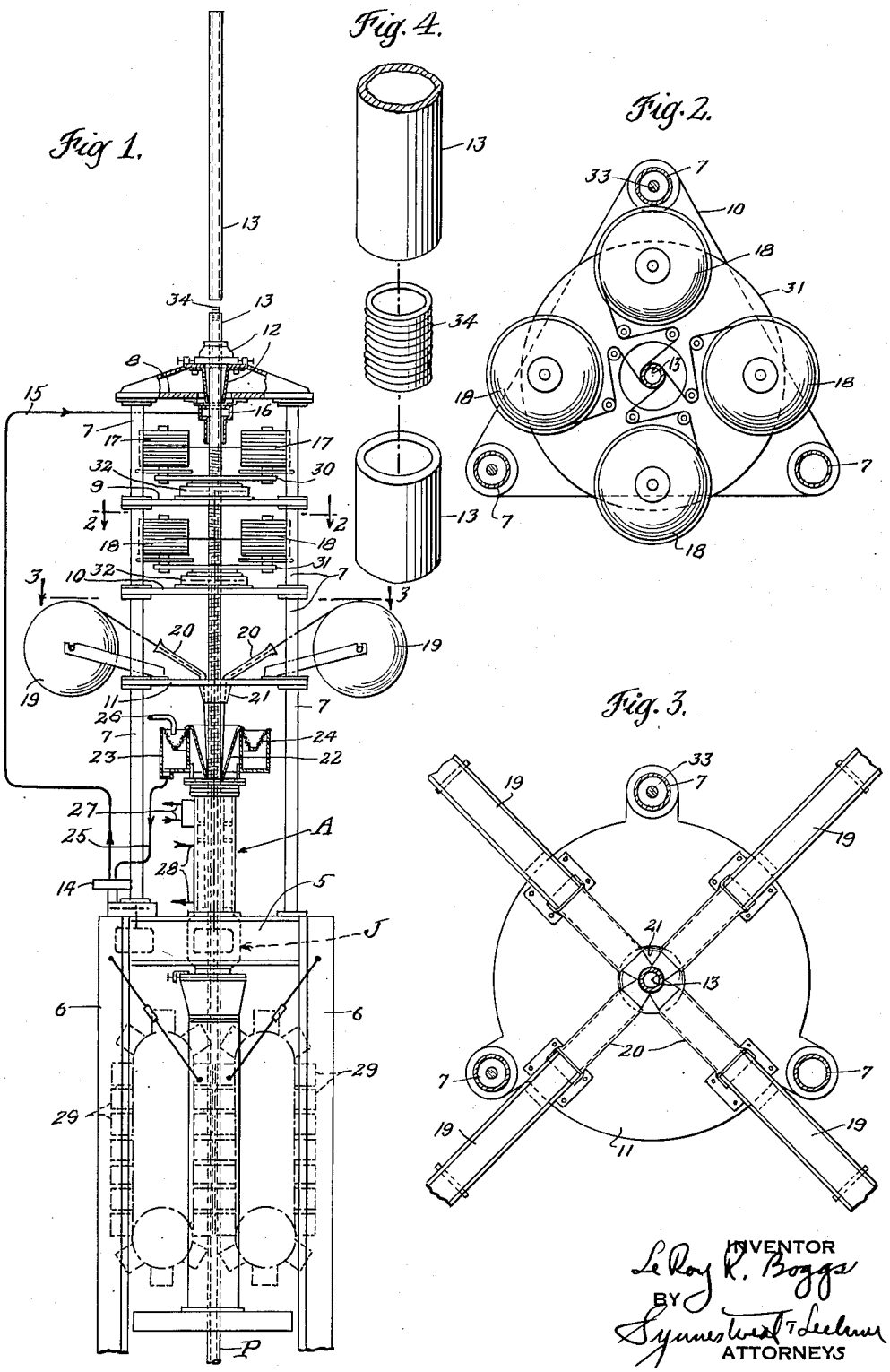

3,249,481
METHOD AND APPARATUS FOR MAKING HOLLOW ELONGATED ARTICLES OF FIBER REINFORCED RESIN MATERIAL
Le Roy R. Boggs, Bristol, Tenn., assignor to Universal Moulded Fiber Glass Corp., Bristol, Va., a corporation of Delaware
Filed Aug. 26, 1963, Ser. No. 304,502
10 Claims. (Cl. 156—172)

This invention relates to production of fiber reinforced resin articles and is particularly concerned with the production of such articles which incorporate or are built upon a core member. While not limited thereto, the invention is particularly adapted to the production of articles of this type in which the core member is tubular, thereby providing for the production of a tubular article in which the hollow core in effect constitutes a lining within the tubular article being made.

The invention is further concerned with the production of articles of the kind described in which the fiber reinforcement includes at least certain reinforcement elements which are helically arranged within the resin material surrounding the core, and preferably also further incorporating certain additional reinforcement elements extended longitudinally of the piece and lying in a layer or ply surrounding the helically wound element or elements. According to the invention therefore, articles incorporating a core may be made with exceptional strength characteristics, i.e. high strength in shear, while also having high hoop strength.

Another important object of the invention is to provide a practical, efficient and economical method for producing articles of the kind referred to, more particularly a method in which such articles may be produced of continuous or indefinite length.

It is a further object of the invention to provide for the production of articles of the kind described in a continuous manner, i.e. without the piecemeal loading and unloading of equipment as is required in prior known reciprocating molding operations and also in prior known filament winding operations; and this is accomplished by the invention notwithstanding the fact that such articles are built up upon preformed cores.

In accordance with the invention the equipment and method is also capable of continuous production of articles of the kind referred to, i.e. production at a substantially uniform rate, although operation of the equipment and method has the further advantage that it may be temporarily interrupted and restarted, without requiring the piecemeal loading or reloading above referred to.

How the foregoing and other objects and advantages are attained will appear more fully from the following description referring to the accompanying drawing in which:

FIGURE 1 is an overall outline elevational view, with a few parts shown in vertical section, illustrating a preferred embodiment of the equipment of the invention and also illustrating the method contemplated;

FIGURE 2 is a plan section taken generally as indicated by the line 2—2 on FIGURE 1, this view being on an enlarged scale as compared with FIGURE 1;

FIGURE 3 is a plan section on the scale of FIGURE 2 but taken generally as indicated by the line 3—3 on FIGURE 1; and FIGURE 4 is a further enlarged view of tubular core members and a system for interconnecting sections of the core so that during passage through the equipment the core may be uninterrupted.

In considering the equipment shown in the drawing and the method, it may first be noted that the equipment and method are adapted for use in the formation of articles from a thermosetting or heat hardenable liquid resin material together with fibrous reinforcements preferably in the form of glass fibers introduced either as rovings or as mats or strips containing randomly oriented fibers, or as mats or strips of woven glass yarns. The resin material employed is desirably a thermosetting or heat hardenable liquid resin, for instance, a polyester laminating resin.

It is here further noted that in general the operation or method comprises the building up of resin impregnated fibrous reinforcement elements on the core member, the resin at this stage being liquid. The core carrying the impregnated reinforcements is fed into the forming passage of a forming device in which heat is applied to set or cure and harden the resin and bond the resin to the core. The solidified and completed article is pulled through and from the forming passage by means of a puller mechanism incorporating gripping elements engaging the solidified piece beyond the discharge end of the forming passage. It is further to be noted that resins employed for this purpose may comprise the commonly available polyester laminating resins although certain other resin materials having similar characteristics may be used.

The equipment as shown in FIGURE 1 is built up on a principal base or support structure comprising a deck 5 mounted by means of columns or posts 6. Rising from the base 5 are three sectionalized supporting posts 7 which serve to carry the cap structure 8 and the intermediate decks 9, 10 and 11.

The base structure 5 serves to carry the forming device generally indicated by the letter A in which heat is applied to set the resin and in which the article is thus formed and solidified. The decks 9, 10 and 11 serve to carry reinforcement feed devices preferably including means for feeding reinforcing elements to be helically wound about the core and also to be laid on the core longitudinally thereof.

The cap structure 8 at the top of the equipment serves to mount guiding devices 12 for guiding the core members 13 downwardly past the several stages of reinforcement feed and ultimately into and through the forming passage in the forming device. These guides 12 provide for guiding the core in alignment with the axis of the forming passage in the forming device A, and the intermediate decks 9, 10 and 11 are provided with apertures through which the core may freely pass, with clearance to accommodate the impregnated reinforcements which are being laid upon the core. The core 13 is of diameter or cross section smaller than that of the forming passage so as to leave room for the impregnated reinforcements.

The resin feed and impregnation system includes a resin pump 14 the discharge side of which is connected by the pipe 15 with a manifold or resin feed device 16 mounted on the cap structure 8 and apertured at the top to permit entry of the core downwardly therethrough, this device preferably having a resin distributing sleeve surrounding but spaced from the core to insure spreading of the resin over the surface of the core. The resin introduced in this manner flows downwardly with and on the core and the reinforcement elements are laid upon this resin carrying surface of the core. Specifically, as shown in FIGURES 1 and 2, the reinforcements include rovings supplied from spools 17 and 18 which are arranged to wind the rovings helically upon the core, one stage or set (17) preferably being wound in one direction and the other stage or set (18) in the other direction. Below the two stages of roving windings, provision is made for the laying of mats or strips on the core surrounding the helical roving windings. For the strip feed, spools of strips are provided as indicated at 19 and, as seen in FIGURE 3, four such spools are here employed, these strips being guided by elements 20 and also by the guide cone 21, in order to lay these strips against the core as the moving core enters the upper end of the forming device A.

Surrounding the core at the entrance end of the forming device is a conical resin receptacle 22 which serves as a reservoir to accumulate the excess resin which is brought down with and on the surface of the core. In accordance with the invention an excess of resin is fed to and downwardly on the surface of the core, i.e. an amount in excess of that required to impregnate the reinforcements and fill the forming passage in the forming device A. This excess therefore builds up in the reservoir 22 and in normal operation continually overflows the edge of the reservoir 22, the overflow being received in the annular chamber 23, a screen 24 being interposed so as to strain out foreign matter. The excess resin collected in this manner is delivered to the input side of the pump 14 through the connection 25 and is thus recirculated. Make-up resin to replace that used in the formation of the article is introduced into the system through the supply 26.

The forming device itself is provided with a generally upright forming passage therethrough, and with a jacket in the upper portion of which is a chamber through which a cooling medium such as water is circulated by means of connections such as indicated at 27. Another chamber is provided in the jacket below the cooling chamber and heating medium is circulated therethrough by means of connections 28. The presence of the cooling chamber above the heating chamber prevents undesired raise in temperature of the resin in advance of the heating zone and thereby prevents accumulation of cured or partially cured resin constituents in the resin circulating and impregnating system. The heating is desirably sufficient to completely solidify the article prior to delivery thereof from the discharge end of the forming passage.

Below the deck or base structure 5 there is a puller mechanism, advantageously in the form of a pair of cooperating crawler tread devices having traveling gripping elements indicated at 29 which grip the solidified article delivered from the discharge end of the forming device and serve to pull it downwardly from the forming device and also to pull or advance the resin and reinforcements into the system at the input side of the forming device. The puller mechanism is suspended as a unit from the support or deck 5 by means of a flexible joint generally indicated at J in FIGURE 1.

Turning again to the reinforcement feed devices, it is noted that each set of spools 17 and 18 is mounted upon a turntable, one identified by the numeral 30 and the other by the numeral 31, the latter appearing in plan in FIGURE 2. These turntables are adapted to be rotated by driving mechanism housed in casings indicated at 32 which are adapted to receive power from drive shafting extended upwardly through one of the sectionalized posts 7, in the instance illustrated such drive being carried through the rear post when viewed as in FIGURE 1, the section of the drive shaft being shown at 33 in FIGURE 2. The strip reels 19 are mounted upon the deck 11 and no provision is here made for rotation of these strips, as it is contemplated that these particular reinforcements be laid upon the core to extend axially thereof.

Attention is now called to the fact that the details of the reinforcement circulation system, the reinforcement feed stations or devices, the forming device with its forming passage and its jacket with cooling and heating chambers, and the mounting of the puller mechanism upon the flexible joint, are fully disclosed in my copending application Serial No. 299,636 filed August 2, 1963, and those details need not be repeated herein. However it is pointed out that in the arrangement of the present invention, the core 13 is a movable core and is fed through the system and constitutes a part of the article being formed which is in contrast to the arrangement illustrated in said copending application in which a fixed core is suspended from the cap structure 8 and depends therefrom downwardly through the reinforcement feed devices and through the forming device to establish an annular channel in which an annular article is formed and from which the atricle is drawn out at the discharge end of the forming device. In the present arrangement the resin supply manifold 16 is also supported in a somewhat different manner than in said copending application. Herein the resin supply manifold is supported from the cap structure 8, being thus independent of the core, where as in the copending application the manifold is carried on the core, which is a fixed part of the system.

It is further here noted that the details of a puller mechanism such as to crawler tread device shown at the bottom of FIGURE 1 need not be considered herein but are disclosed in certain of my copending applications, for instance in copending application Serial No. 142,749, filed September 18, 1961, issued as Patent No. 3,151,354 on October 6, 1964.

With regard to the core contemplated for use in the present invention, it is pointed out that cores of a variety of types and shapes, either hollow or solid, may be employed, and such cores may be made of any of a variety of materials. As one illustrative example of a tubular type of core, reference is made to a vulcanized paper or fiberboard type of tube suitable, for example, as a liner in an electrical fuse tube.

According to the invention it is contemplated that pieces of a tubular core may be interconnected by a threaded nipple 34, as shown in FIGURE 4. This will serve to assemble the core sections temporarily while the core is fed through the system, and provides for tight interconnection of the core sections in order to withstand the pulling force of the puller mechanism without danger of breakage. The finished piece incorporating such a core is indicated at P as emerging at the bottom of the puller mechanism in FIGURE 1. In a region beyond the lower end of the puller mechanism, it is contemplated that the article formed be severed at intervals, advantageously in the region of interconnection of the sections of the core, and in this event the threaded nipples may be recovered and reused.

It will be clear that in the event of employment of other forms of core pieces, for instance solid rods, other devices may be employed for temporarily interconnecting sections of such a core. Moreover in the event of thin and relatively flexible cores, whether tubular or solid, extended lengths or an infinite length of such a core may be fed from any suitable source of supply, such as a coil or reel.

In considering the operation of the illustrative system herein disclosed, it is noted that helically wound reinforcing elements are applied directly to the core, the longitudinal strips supplied from reels 19 overlying the helical windings and thereby providing a layer or ply of substantial axial strength at the outer surface of the piece being formed. This outer layer or ply frictionally engages the forming wall of the forming passage and thereby aids in protecting, so to speak, the inner helically wound reinforcing elements, which might otherwise become disturbed or jammed in the forming device as a result of drag near the surface of the piece.

The combination of reinforcements helically wound upon a core forming a permanent part of the article and lying beneath reinforcement elements extended lengthwise of the article also constitutes a desirable arrangement and distribution of overall reinforcement within the article itself, the core and the outer longitudinal elements providing reinforcement to resist bending, and the helical elements providing reinforcement to increase the hoop strength.

The feed of the resin by establishing a stream or coating thereof on the surface of the moving core provides an effective manner of impregnation of the fibrous reinforcement regardless of the arrangement and distribution of the various reinforcement elements used. In this connection it is noted that while the combination of at least some helical winding inside of longitudinally extended reinforcements represents a preferred arrangement for many purposes, the reinforcements may be laid on the moving core in various different ways. Such variations are provided for by the capability of the equipment to be assembled and used in various relationships in the manner fully disclosed in my copending application Serial No. 299,636, above referred to.

I claim:

1. Equipment for making elongated articles composed of fiber reinforced resin material, comprising a forming device having a generally upright forming passage therethrough, mechanism for feeding fibrous reinforcements impregnated with a hardenable liquid resin material downwardly into and through the forming passage along with a downwardly moving core, guiding means for the core spaced from the entrance end of the forming passage and having a core guiding passage in alignment with the forming passage, said mechanism including a feed device for laying a fibrous reinforcement on the core at a point intermediate the core guide and the entrance end of the forming passage, means for feeding a heat hardenable liquid resin material to the surface of the core between the core guide and said point of laying on of the fibrous reinforcement, means for heating the resin material in the forming passage to harden the article therein, and puller mechanism for engaging and pulling on the hardened and formed article beyond the discharge end of the forming passage.

2. Equipment according to claim 1 in which the resin feed means comprises an annular feed chamber having an opening therethrough accommodating the core and through which the core moves in the feed thereof.

3. Equipment for making elongated articles composed of fiber reinforced resin material, comprising a forming device having a generally upright forming passage therethrough, a tower structure rising above the upper end of the forming device and having in an upper region thereof a guide for a moving core positioned to guide the core downwardly into the entrance end of the forming passage, feeding means for delivering to the surface of the core below the core guide a hardenable liquid resin material, mechanism for laying a fibrous reinforcement onto the resin carrying surface of the core as the core moves downwardly toward the entrance end of the forming passage, and a puller mechanism for engaging and pulling on the formed article below the discharge end of the forming passage to thereby advance the core, reinforcement and resin material into and through the forming passage.

4. Equipment for making elongated articles composed of fiber reinforced resin material, comprising a forming device having a forming passage therethrough in which the article is formed and solidified, a guide for a moving core positioned to guide the core into the entrance end of the forming passage, feeding means for delivering hardenable liquid resin material to the surface of the core as the core moves toward the entrance end of the forming passage, mechanism for laying a fibrous reinforcement on the resin carrying surface of the core as the core moves toward the entrance end of the forming passage, and a puller mechanism for engaging and pulling on the formed article beyond the discharge end of the forming passage to thereby advance the core, reinforcement and resin material into and through the forming passage.

5. A method for making elongated articles composed of fiber reinforced resin material, comprising feeding a core structure through a forming passage, the core structure being of smaller outside dimension than the forming passage to provide a channel of annular shape adapted to receive resin impregnated fiber reinforcement, delivering a layer of heat hardenable liquid resin material to the surface of the core structure in advance of the entrance end of the forming passage, laying fiber reinforcement on the resin carrying surface of the core structure to effect reisn impregnation of the reinforcement and feeding the impregnated reinforcement along with the core structure into the entrance end of the forming passage, the quantity of liquid resin fed to the core being in excess of that needed to impregnate the reinforcement and fill said annular channel, collecting said excess resin at the entrance end of the forming passage and recirculating the collected excess resin to said layer of resin on the core structure, heating the resin in the forming passage to solidify the articles therein, and pulling on the solidified article and core beyond the discharge end of the forming passage to advance the core and materials into and through the forming passage.

6. A method according to claim 5 in which the forming passage is arranged in a generally upright position, the direction of feed of the core and of the resin and reinforcement being downwardly into the upper end of the forming passage, and further in which at least two plies of fiber reinforcement are layed on the core structure at successive elevations during the downward feed of the resin carrying core structure.

7. A method according to claim 5 in which the core structure is sectionalized, the core sections being interconnected when fed into and through the forming passage, and further including severing sections of formed article from each other in zones corresponding to zones of interconnection of the core sections.

8. A method according to claim 5 and further including adding make-up resin to the recirculated excess resin.

9. A method according to claim 5 in which fiber reinforcement is layed on the core structure in at least two plies one of which is helically wound on the core structure and the outermost of which is applied in longitudinally extended position.

10. A method for making an elongated hollow article composed of fiber reinforced resin material, comprising feeding a hollow core structure through a forming passage, the core structure being of smaller outside dimension than the forming passage to provide a channel of annular shape adapted to receive resin impregnated fiber reinforcement, applying a layer of heat hardenable liquid resin material to the surface of the core structure in advance of the entrance end of the forming passage, laying fiber reinforcement over said layer of resin material on the surface of the core structure to effect resin impregnation of the reinforcement on the core structure and feeding the impregnated reinforcement along with the core structure into the entrance end of the forming passage, heating the resin in the forming passage to solidify the resin and to bond the reinforcement and the core structure to each other, and pulling on the solidified article and core beyond the discharge end of the forming passage to advance the core, resin and reinforcement into and through the forming passage.

References Cited by the Examiner

UNITED STATES PATENTS

| | | | |
|---|---|---|---|
| 864,168 | 8/1907 | Hinsky | 156—393 |
| 1,610,910 | 12/1926 | Williams | 156—148 XR |
| 1,914,455 | 6/1933 | Pahl | 138—130 |
| 2,427,507 | 9/1947 | Powell et al. | 156—148 XR |
| 2,625,979 | 1/1953 | Harris et al. | 156—431 |
| 2,747,616 | 5/1956 | De Ganahl | 138—130 |
| 2,751,320 | 6/1956 | Jacobs et al. | 156—180 |
| 2,871,911 | 2/1959 | Goldsworthy et al. | 156—441 XR |
| 2,887,721 | 5/1959 | Blanchi et al. | 156—432 XR |
| 2,974,713 | 3/1961 | Hydrick | 156—393 |
| 3,067,803 | 12/1962 | Fleury | 156—431 |
| 3,068,134 | 12/1962 | Cilker et al. | 156—381 XR |

EARL M. BERGERT, *Primary Examiner.*

LEWIS J. LENNY, *Examiner.*